United States Patent [19]

Daughenbaugh et al.

[11] 4,317,147
[45] Feb. 23, 1982

[54] SANDWICH TYPE MAGNETORESISTIVE READ HEAD

[75] Inventors: Gerald A. Daughenbaugh, Tucson, Ariz.; Philip W. Koob, Concord, N.C.; Arthur E. Moxley, Longmont, Colo.; Joseph E. Wallace, Charlotte, N.C.

[73] Assignee: International Business Machines Corporation, Armonk, N.Y.

[21] Appl. No.: 105,480

[22] Filed: Dec. 20, 1979

[51] Int. Cl.³ .......................... G11B 5/12; G11B 5/22
[52] U.S. Cl. .................................. 360/113; 360/122; 338/32 R; 324/252
[58] Field of Search ............... 360/113, 125, 126–127, 360/122; 338/32 R; 324/252

[56] References Cited

U.S. PATENT DOCUMENTS 3,840,898 10/1974 Bajorek et al. ................. 360/125 X
3,921,217 11/1975 Thompson ....................... 360/119 X

FOREIGN PATENT DOCUMENTS 488867 10/1975 U.S.S.R. .............................. 360/122

OTHER PUBLICATIONS

IBM/TDB, vol. 20, No. 9, Feb. '78, p. 3619, "Wear Resistant Sensor Tip", by Garriss et al.

*Primary Examiner*—John H. Wolff
*Attorney, Agent, or Firm*—Nathan N. Kallman

[57] ABSTRACT

A magnetoresistive head assembly comprises a silicon substrate, a magnetoresistive element mounted on the substrate, and sapphire members formed around said substrate in a sandwich type configuration. The portion of the head which interacts in transducing relation with a magnetic medium is so configured as to realize improved wear characteristics as well as good heat dissipation with low thermal noise.

6 Claims, 4 Drawing Figures

SANDWICH TYPE MAGNETORESISTIVE READ HEAD

TECHNICAL FIELD

This invention relates to a magnetic head assembly and in particular to a magnetic head assembly utilizing a magnetoresistive (MR) read element.

An object of this invention is to provide a magnetoresistive read head having improved wear characteristics and longer life.

Another object of this invention is to provide a magnetoresistive read head having good heat dissipation with resultant reduction in thermal noise.

A further object of this invention is to provide a magnetoresistive read head with the magnetoresistive element located below the outer sapphire members.

Still another object of this invention is to provide a magnetoresistive read head with the magnetoresistive element operated in the magnetically saturated condition.

Yet another object of this invention is to provide a magnetoresistive read head with the sapphire material orientation such as to maximize wear performance.

BACKGROUND ART

The use of MR elements as sensors for reading magnetically recorded data is well known. However, MR sensors are sensitive to thermal noise, among other things. To reduce thermal noise problems, MR sensor elements have been deposited, or otherwise mounted, on silicon substrates or similar material disposed in magnetic head assemblies. Silicon is easy to fabricate and provides good heat conduction. However, magnetoresistive heads with silicon substrates have been found to be subject to excessive wear when used for scanning magnetic media which is contaminated with particulates.

BRIEF DESCRIPTION OF THE DRAWINGS

The invention will be described in detail with reference to the drawings in which.

Disclosure of the Invention

Figure 1:
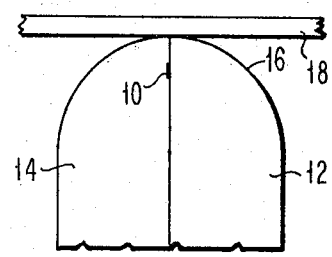
FIG. 1 is a simplified representation of a prior art magnetoresistive head, employing an MR element.

With reference to FIG. 1, an example of a prior art magnetoresistive read head includes a magnetoresistive element 10, which is deposited along with suitable electrical conductors and a protective $Al_2O_3$ coating on a silicon substrate 12. A sapphire layer 14 is then epoxy bonded to the silicon substrate covering the MR element. The head has a spherical contoured face 16 which interfaces in transducing relation with a magnetic medium 18, such as a magnetic tape.

In the silicon-sapphire type head illustrated in FIG. 1, the majority of wear is experienced by the silicon material as contrasted to the harder sapphire material. As a result, with increased use of the head, a large undercut area is developed in the silicon layer, so that the magnetoresistive element 10 is either exposed or worn away. If the magnetoresistive element is exposed, the head will fail due to corrosion of the magnetoresistive element. In either case, an opening in the electrical current path will result.

Figure 2:
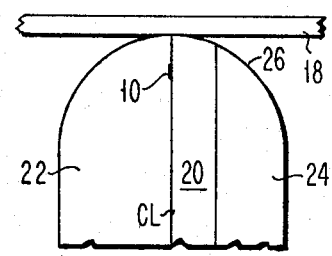
FIG. 2 is a simplified representation of the novel magnetoresistive head of this invention.

As depicted in FIG. 2, the novel head assembly of this invention is formed as a sandwich configuration in which the silicon substrate 20 is surrounded by sapphire members 22 and 24, such that wear of the silicon layer does not result in an undercut surface that wears away to the level of the MR element. Alternatively, a substrate other than silicon may be used. Such other substrate could be, for example, boro silicate or ferrite. Likewise, a material other than sapphire can be on both sides of the substrate, so long as it is harder than the substrate. Examples of such other materials are diamond, alumina, ceramic, and silicon nitride.

Figure 3:
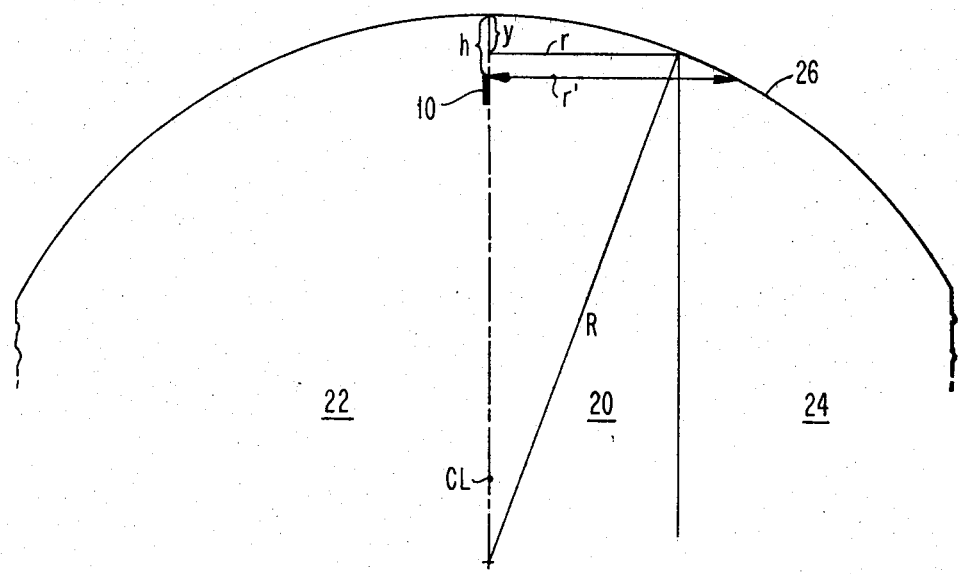
FIG. 3 is an illustration showing dimensional relationships of the novel magnetoresistive head.

It has been determined, in accordance with this invention, that the dimensions of the sandwich members relative to the contoured face of the sensing head and the centerline (CL) should have a defined relationship with respect to the radius of the spherically contoured head and the height or distance from the MR element to the face along the centerline. This relationship is such that r, where r is the thickness of the silicon member 20, and must be less than r' where $r' = \sqrt{2Rh}$; R is the radius of a sphere partially defined by the arcuate face 26, and h is the distance from the top of the MR element 10 to the face 26 along the centerline, as illustrated in FIG. 3. In one embodiment, if R is selected to be 0.050 inch and the magnetoresistive element is located at a height h of 750 microinches, the silicon substrate thickness 20 must be less than 0.0086 inches in order to provide substantial improvement in the wear characteristics. In addition, the thickness of the silicon substrate 20 will determine the heat dissipation and the thermal noise. In this embodiment, the thickness of the sapphire member 22 is about 0.013 inch and the thickness of the sapphire member 24 is about 0.008 inch.

During operation of the sensor device and after extensive use of the sensor device for reading data from a record medium, the upper portion of the silicon substrate 20 at the face 26 is expended and worn down for a distance y. At this point, the sapphire members 22 and 24 control the wear performance of the magnetoresistive read head. The MR element 10 is disposed in a location within the sensor device, relative to the face 26 and adjacent magnetic medium, to effectively sense recorded data without degradation of data signal. That is, the magnetoresistive element 10 is operated in the magnetically saturated condition.

Figure 4A:
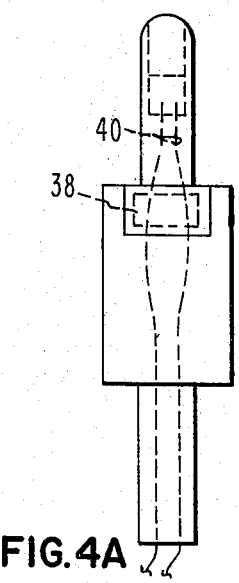
FIGS. 4A and 4B are front and side views respectively of the magnetoresistive head sensor assembly, made in accordance with this invention.
Figure 4B:
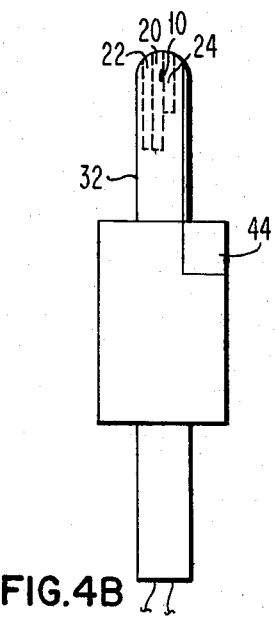

As depicted in FIGS. 4A and 4B, a magnetic head sensor device made in accordance with this invention includes a sapphire member 22 that is bonded to a plastic housing 32, and a silicon chip 20 which is bonded to the sapphire member 22. A magnetoresistive element 10 is deposited on the silicon substrate 20 and connected to a capacitor 38 by wires 40. The capacitor 38 serves to reduce the effects of static electricity. Thereafter, a second sapphire member 24 is epoxy bonded to the silicon substrate 20. To complete the assembly, a plastic cap 44 is bonded to the housing to form the magnetoresistive head assembly.

During operation of the sensing device, an electrical current in the milliamp range is passed through the MR element. The resistance of the MR element is changed in response to a sensed magnetic field generated by flux transitions on the magnetic record. Thus, by monitoring the voltage across the MR element, due to resistance change, data bits on a recorded magnetic record can be read.

By means of the sandwich type magnetoresistive head disclosed herein, good wear performance, low thermal noise and good heat dissipation are realized. The sandwich type magnetoresistive head sensor structure is also easy to manufacture.

What is claimed is:

1. A magnetoresistive head assembly consisting of
   a silicon substrate having two sides;
   a magnetoresistive element disposed on one side of said silicon substrate;
   a first sapphire member bonded to said one side of said silicon substrate and said magnetoresistive element; and
   a second sapphire member bonded to the other side of said silicon substrate whereby a sandwich configuration is formed so that said assembly realizes improved wear life, improved heat dissipation characteristics and improved ease in manufacture.

2. A magnetoresistive head assembly as in claim 1, wherein said head assembly has a spherical contoured face.

3. A magnetoresistive head assembly as in claim 2, wherein said magnetoresistive element is located at the centerline defined at the junction of said silicon substrates and first sapphire member.

4. A magnetoresistive head assembly as in claim 3, wherein the thickness of said silicon substrate r is determined by the relationship $r < \sqrt{2Rh}$ where R is the radius of the head and h is the depth of the magnetoresistive element below the apex of the spherical surface.

5. A magnetoresistive head assembly as in claim 3, wherein the distance from said magnetoresistive element measured along a line perpendicular to said centerline to said spherical face is greater than the thickness of said silicon substrate.

6. A magnetoresistive head assembly as in claim 1, including a capacitor wired to said magnetoresistive element.

* * * * *